(12) United States Patent
Uchida et al.

(10) Patent No.: US 6,352,020 B2
(45) Date of Patent: Mar. 5, 2002

(54) APPARATUS FOR PRODUCING A VINEGARED RICE ROLLED IN DRIED LAVER (NORIMAKI), OR OTHER ROLL FOODSTUFF

(75) Inventors: Junya Uchida, Kawasaki; Takashi Hosogane, Sagamihara, both of (JP)

(73) Assignee: Kabushiki Kaisha Audio-Technica, MIchida (JP)

( * ) Notice: Subject to any disclaimer, the term of this patent is extended or adjusted under 35 U.S.C. 154(b) by 0 days.

(21) Appl. No.: 09/910,115

(22) Filed: Jul. 20, 2001

(30) Foreign Application Priority Data

Jul. 31, 2000 (JP) .......................... 2000-232192

(51) Int. Cl.7 .......................... A21C 9/00; A21C 11/00; A23P 1/00; B29C 69/00
(52) U.S. Cl. .................. 99/450.6; 99/450.2; 99/450.7; 425/112; 425/383
(58) Field of Search .................. 99/352, 353, 450.1, 99/450.2, 450.6, 450.7, 494; 426/502, 501, 512, 513, 297; 425/110, 112, 319, 383, 436 R, 308, 328, 298, 343, 204; 53/215, 216, 390, 516

(56) References Cited

U.S. PATENT DOCUMENTS

| | | | | |
|---|---|---|---|---|
| 1,873,920 A | * | 8/1932 | Bemis | 99/450.7 |
| 3,930,440 A | * | 1/1976 | Ohkawa | 99/450.6 |
| 4,047,478 A | * | 9/1977 | Trostmann et al. | 426/502 |
| 4,334,464 A | * | 6/1982 | Shinriki | 99/450.6 |
| 4,439,124 A | * | 3/1984 | Watanabe | 425/112 |
| 4,457,225 A | * | 7/1984 | Bakker | 99/450.6 |
| 4,516,487 A | * | 5/1985 | Madison et al. | 99/450.2 X |
| 4,637,304 A | * | 1/1987 | Suzuki | 99/450.2 |
| 4,674,967 A | * | 6/1987 | Oseka | 425/383 X |
| 4,687,670 A | * | 8/1987 | Rodriguez | 426/297 |
| 4,953,455 A | * | 9/1990 | Figueras et al. | 53/215 X |
| 5,381,728 A | * | 1/1995 | Tateno | 99/450.1 |
| 5,387,149 A | * | 2/1995 | Caveza | 99/450.6 X |
| 5,870,948 A | | 2/1999 | Ono | |

FOREIGN PATENT DOCUMENTS

JP 7-75512 3/1995

* cited by examiner

Primary Examiner—Timothy F. Simone

(57) ABSTRACT

There is provided an apparatus for producing a roll foodstuff, which includes a roll maker having improvement in push of three rotating plates, wherein the first and second rotating plates (32) and (33) have cam members (41) and (42) with each curved bottom between the front and the rear, respectively; wherein the cam members (41) and (42) are symmetrically disposed on the back of respective first and second rotating plates such that the curved bottoms are opposite each other; and wherein the lift board (61) is in contact with the cam member so that upward movement of the lift board (61) causes rotation of the first and second rotating plates.

5 Claims, 6 Drawing Sheets

(a)

(b)

(c)

(a)

(b)

(c)

APPARATUS FOR PRODUCING A VINEGARED RICE ROLLED IN DRIED LAVER (NORIMAKI), OR OTHER ROLL FOODSTUFF

FIELD OF THE INVENTION

The present invention relates to an apparatus for producing a vinegared rice rolled in dried laver or other rolled up foodstuff or food product, and particularly to the apparatus which provides products with steadily roll, and improvement for easy removal of parts to be cleaned therefrom.

BACKGROUND OF THE INVENTION

Generally, the vinegared rice rolled in dried later is sold in supermarkets or chain stores. The production of the vinegared rice rolled in dried laver, insufficient handmade was carried out by process in which a bamboo mat, dried laver put on the mat, vinegared rice spread over the dried laver, and ingredients put on the vinegared rice are rolled up with hands. Now, it is shifting to the process in which the automatic apparatus with high effect production are used.

As an example, Japanese Patent Publication 7-75512A discloses such the automatic apparatus. The apparatus has a base housing (not shown), a hopper 12 disposed above the base housing to allow vinegared rice R to be contained therein and fed from its lower opening, a roll maker 1 disposed below the hopper 12 for producing a rolled up food product, and a feeder 13 disposed between the hopper opening therebelow and the roll maker 1 so as to feed the vingared rice R from the hopper 12 to the roll maker, as shown in FIG. 1.

The hopper 12 stirs vinegared rice R with its stirrers 121 therein. The stirred vinegared rice enters into the feeder 13 through the hopper opening. The feeder 12 presses against and spreads the fed, stirred vinegared rice R in a board shape with its upper and lower rollers 132 and 133.

The roll maker 1 is assembled in the upper base housing at a position below the outlet of the feeder 12, and comprises a base board 2 having an opening at its predetermined position, and a rolling plate 3 extending longitudinally of the apparatus and put on the opening of the base board. The rolling plate comprises a plurality of connective plates, preferably four serial plates, as shown in FIG. 7.

The rolling plate 3 has a stationary plate 31 removably fixed to or formed integral with the base board 2, first and second rotating plates 32 and 33 rotatably connected to respective trailing and leading portions of the stationary plate 31, and a third rotating plate 34 connected to the leading portions (free end) of the first rotating plate 32. The leading side surfaces of the third rotating plate 34 have connections with link arms 35 which are connected to the predetermined portions of the base board 2 at positions midway between the leading and trailing portions of the first rotating plate 32, respectively.

The roll maker 1 includes fan shaped flanges 321 and 331 mounted on one of side surfaces of respective first and second rotating plates, a lift board 5 disposed below the base board 2 in the lower base housing to move up and down by a drive such as motor (not shown), and a pantographic lifting mechanism comprised of a pair of lifter arms 4a and 4b connected between the fist and second rotating plates, respectively, and lift plate 5.

The flanges 321 and 331 are downwardly arranged, protruding from the reverse sides of the first and second rotating plates 32 and 33, respectively, such that one of respective radial edges with respect to the arc is connected to each of first and second rotating plates 32 and 33, while the respective other edges are opposed to each other. At the lower radial edges of each flange 321 and 331, lifter arms 4a and 4b are pivotably mounted, respectively.

The other ends of each lifter arms 4a and 4b are pivotably mounted at the upper portions of an arm-mounting member removably fixed in a recess at the upper portions of the lift board 5, respectively. The fixation of the arm-mounting member in the recess is a snap-on lock L.

When the lift board 5 begins to go up, the lifter arms 4a and 4b operate to open sideward, each moving upward, as shown in FIG. 8. The upward movement of the lifter arms 4a and 4b causes upward rotation of both the first and second rotating plates 32 and 33 from their position at the base board 2, and the link arms 35 also upwardly rotate about the base board 2 so that the leading portion (free end) of the third plate 34 comes up to the position at the leading portion of the second rotating plate 33 with pull of the link arms 35 connected thereto.

Turning to FIG. 7, when the rolling plate 3 extends between the leading and trailing portions of the opening of the base plate 2, dried laver is placed on the first to third rotating plates Deft to right as shown in the figure). The vingared rice R in the hopper 12 passes through the feeder 13 to fall down into the dried laver in the fixed plate 31, as shown in FIG. 1. When the board shaped vinegared rice R falls down, it is cut in lengths by a cutter device (not shown) in the feeder. Then, the required ingredients are placed on the sheet shaped vinegared rice R.

Turning to FIG. 8, the first, second and third rotating plates 32 to 34 are located to press against the side surfaces Deft and right surfaces) and top surface of the rolled up food product, respectively. Thus, the vingared rice, the ingredients, and the dried laver are rolled up by and formed into a stick shape in the rolling plate 3.

Thereafter, when the lift board 5 begins to go down, the lifter arms 4a and 4b operate to close to come back to the original position. Thereby, the first to third rotating plates 32–34 downwardly rotate to come back to their original positions, respectively so that the rolling plate 3 opens with extension of the connective rotating plates. Thus, the vinegared rice rolled in dried laver appears. As a result, the operator does only woks of operating the apparatus, and putting the dried laver and ingredients. It is obvious that the apparatus eliminates requirement of the operator having sufficient skills, and allow the operator to do easy preparation of the vinegared rice rolled in the laver.

The forgoing apparatus has a first problem of that the transmitted push from the lift board 5 to the first and second rotating plates 32 and 33 through the lift arms 4a and 4b forming its pantograph-shape can not apply the sufficient force to press against each of the rotating plates 32 to 34, depending on the vinegared rice rolled in dried laver having its diameter that will be larger. Since the food product has reaction with the pressure of the rolling plate 3 when rolled up, the rolling plate 3 cannot produce its sufficient action.

Therefore, although the apparatus serves sufficient function as production of the vinegared rice rolled in dried laver that is formed by a thin roll, it is not suitable for a thick roll comprised of large amounts of vinegared rice and ingredients.

Furthermore, the apparatus has a second problem of having difficulty in the cleaning works. Generally, parts of apparatuses for producing rolled up food need cleaning after they end the works. Turning to the cited roll maker, after removal of the base board 2 from the base of the apparatus, its cleaning will be carried out.

When the operator would like to clean the base board 2, he has to open the snap-on lock L to separate the lifter arms 4*a* and 4*b* from the lift board 5. For opening of the snap-on lever, he is required to put his hand. Therefore, in the foregoing apparatus, the cleaner has to do troublesome works for cleaning of the roll maker 1.

SUMMARY OF THE INVENTION

It is an object of the present invention to provide the apparatus having a roll maker in which its rolling plate has rotating plates with strong force applied to nori (a sheet of dried laver or seaweed) or a other sheet-shaped food such as a omlette, vinegared rice or other filler such as pilaf and minced meat, and ingredients so as to produce strong thick or thin roll food product.

It is another object of the present invention to provide an apparatus for producing a rolled up food by a roll maker, which eliminates connection of the lift board with the base board so as to provide easy removal of the base board therefrom.

To accomplish the foregoing objects, the present invention provides a roll maker which comprises a rolling plate, a base board disposed thereunder, and a slid board disposed thereunder, having improved relationship of movements of the rolling plate and the lift board of the drive.

The improvement in the rolling plate is to provide cam mechanisms symmetrically attached on respective first and second back rotating plates. Each of the cam mechanisms is short in the front height with respect to the back height so that the base is curbed at the predetermined curvature, wherein respective front faces are opposite to each other. The improvement in the drive is to provide connecting relationship between the lift board thereof and the cam mechanisms for changeover from the upward and downward movement of the lift board to the rotation of the cam mechanisms along the curved leading portions or bottom thereof. The rotating cam mechanisms produce rotation of the first and second rotating plates with its curved leading portions.

In this construction of the roll maker, direct push of the lift board biases on the first and second rotating plates through the cam mechanisms so that the rolled up food may be tightened with much larger pressure. The cam members, which are attached on the reverse first and second rotating plates, respectively, require only their placement to a position where the lift board is brought into contact therewith, and hence may be disposed independently of the lift board. Therefore, the connecting relationship between the lift board and the cam mechanisms, respectively, does not require the snap-on lock that is applied to connection of the lift board with the base board in the prior arts or foregoing apparatus. This provides very easy removal and attachment of the base board from and to the base.

In accordance with the preferred embodiment of the present invention, each of the cam mechanisms has a plurality of rollers, and each of curved portions of the cam members is a curvature with approximate fitness for the arrangement of a plurality of rollers along it. The arranged rollers act to provide decrease in frictional resistance of the lift board against the cam mechanisms.

In addition, each of the reverse first and second rotating plates of the roll maker is provided with a lever for opening and closure of the rolling plate. Each lever comprises an arm portion and a hook of L shape extending from the leading portion thereof. On the extended reverse rolling plate, the left, and right hooks are inverted L with 90° anticlockwise rotation by the right angle, and L with 90° clockwise rotation, respectively, and their bases are opposed to each other approximately at the median portion between the leading and trailing portions of the stationary plate.

The slide board includes a base member, and a rolling plate opening retention unit. The retention unit extends approximately from the leading portion approximately to the trailing portion of the base member, and has resilient forces against the leading portions of respective hooks for opening of the rolling plate.

The forces of the retention unit comprises a pair of guide shafts arranged in parallel to each other; a pair of right and left slide blocks movably carried by the pair of guide shafts, and having face to face contact with the leading portion of w each of the hooks; and springs having forces exerted in right and left pushes on the trailing portion of respective slide blocks to cause the hooks to move in the opening direction of the rolling plate under the action of the push. Thus, the retention unit can retain opening of the rolling plate.

In further addition, push of the closing rolling plate to the rolled up food gains the force of the springs on the slider blocks, since much reaction of the slider blocks against the springs is produced by the upward movement and push of the lift plate against the cam devices. The reacting force increases push of the rotating plates to the rolled up food.

In accordance with the preferred embodiment of the present invention, the slide blocks has each one push roller having face-to-face contact with the leading portions of respective hooks so as to decrease the frictional resistance of the hooks thereto.

DETAILED DESCRIPTION OF THE PREFERRED EMBODIMENTS

Figure 7:
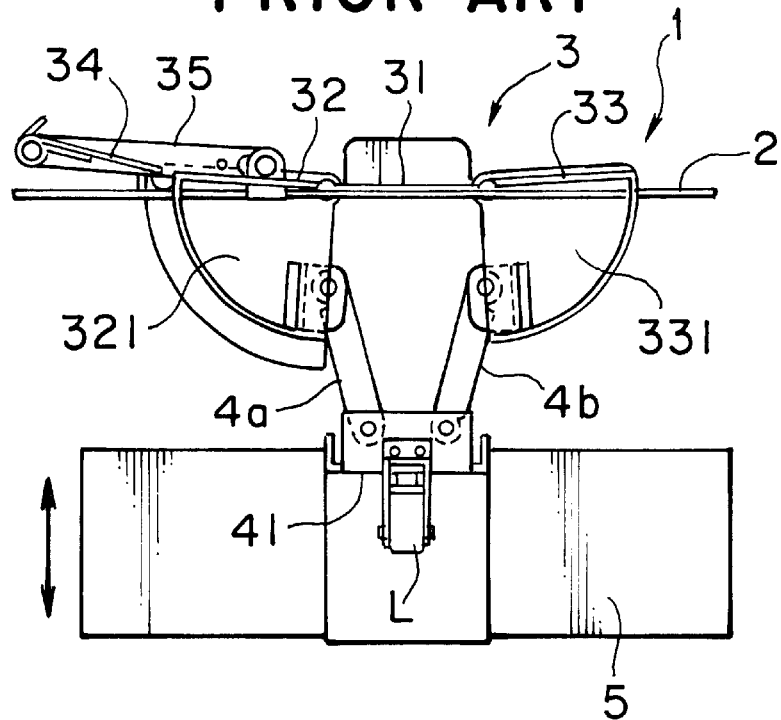
FIG. 7 is a schematic front view of illustrating a conventional roll maker of the apparatus.
Figure 8:
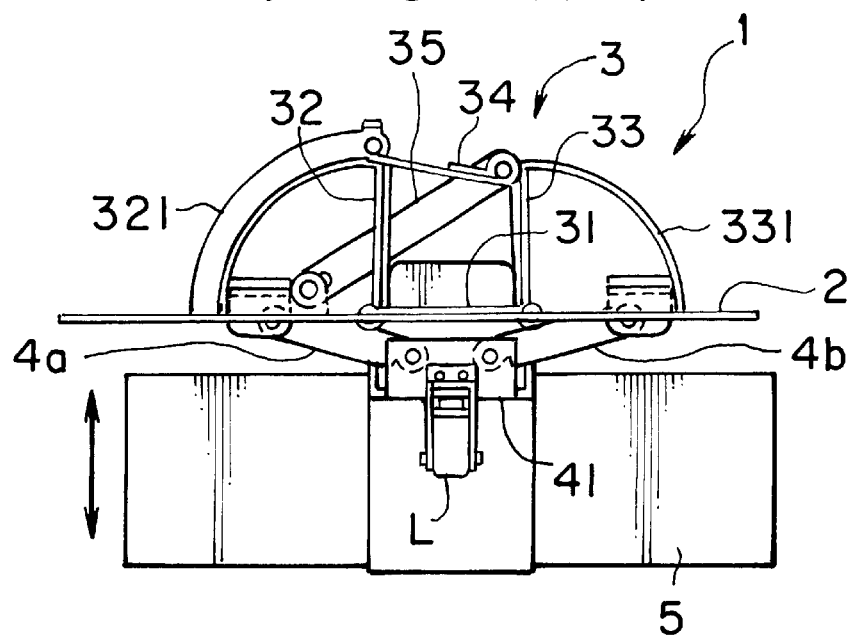
FIG. 8 is a schematic front view of illustrating the rolling up operation of conventional roll maker.

Description will now be made in further detail of the composition of the present invention, referring with drawings. Elements, which are same as or may be regarded same as that of the foregoing prior art (FIGS. 7 and 8), are indicated by the same numeral references.

Figure 1:
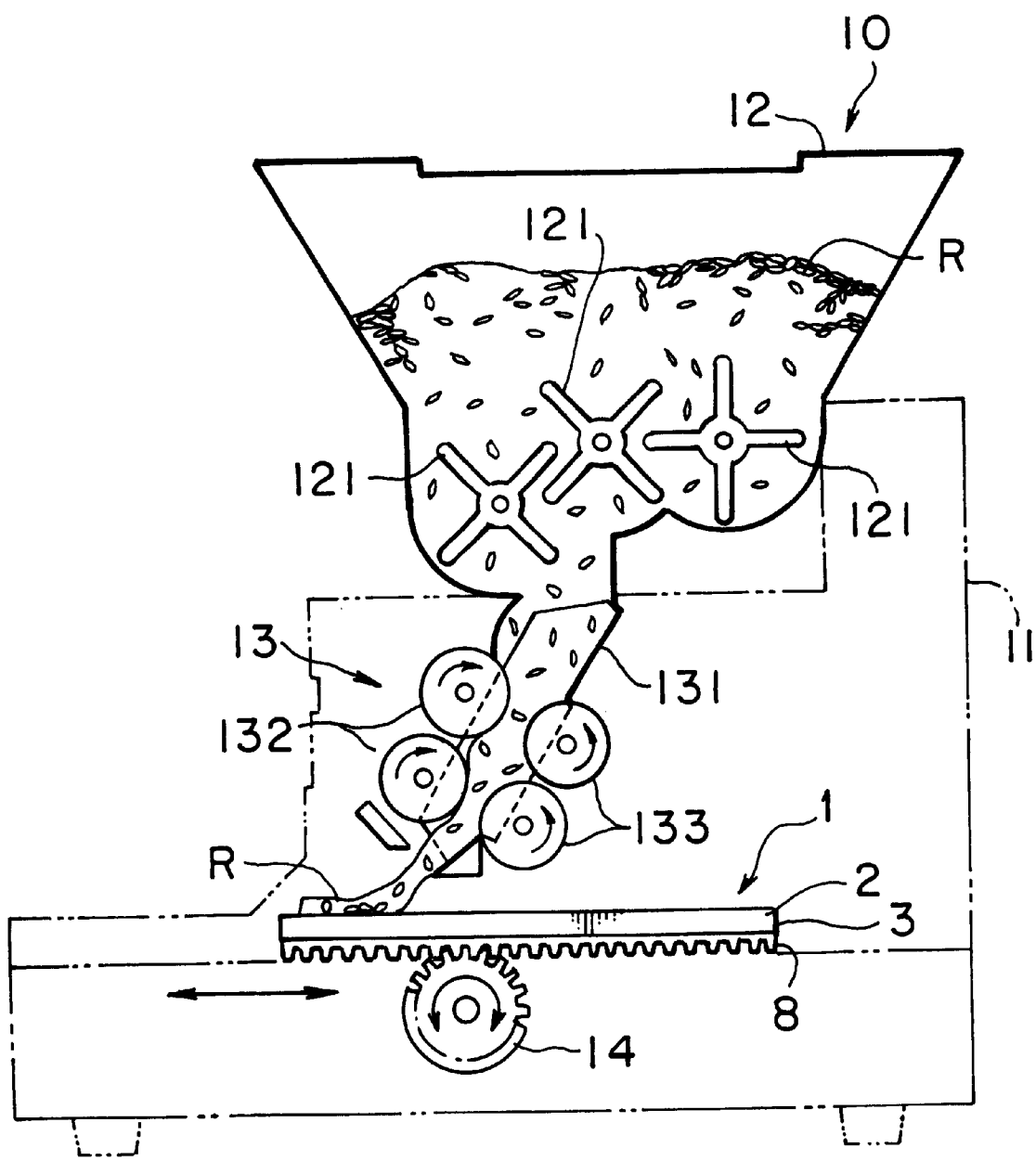
FIG. 1 is a schematic view of illustrating by way of example one manner in which an apparatus for producing a vinegared rice rolled in a sheet of dried lever or other roll foodstuff has a rolling mill; and a roll maker of the present invention as assembled thereto.

Referring to FIG. 1, the reference numeral 1 shows a roll maker according to the present invention, in combination with a vinegared rice rolling mill 10. The vinegared rice rolling mill 10 is located at the top portion of the apparatus body, and comprises a hopper 12 with an upper opening and an agitating element 121 therein, and a feeder 13 with upper and lower rollers 132, 133 arranged along the guide plate 131.

Figure 2:
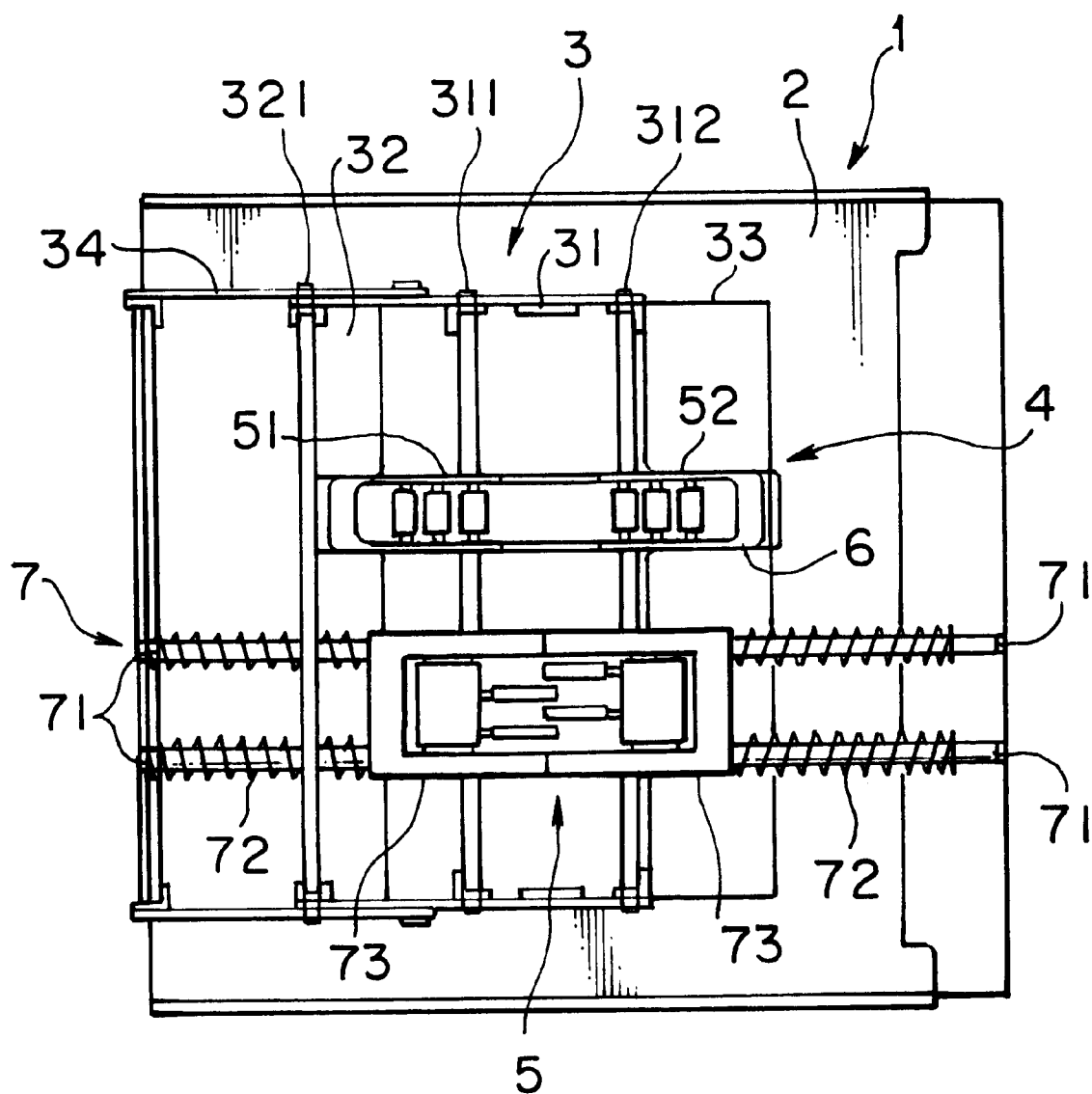
FIG. 2 is a plan perspective view of the roll maker of the apparatus.
Figure 3:
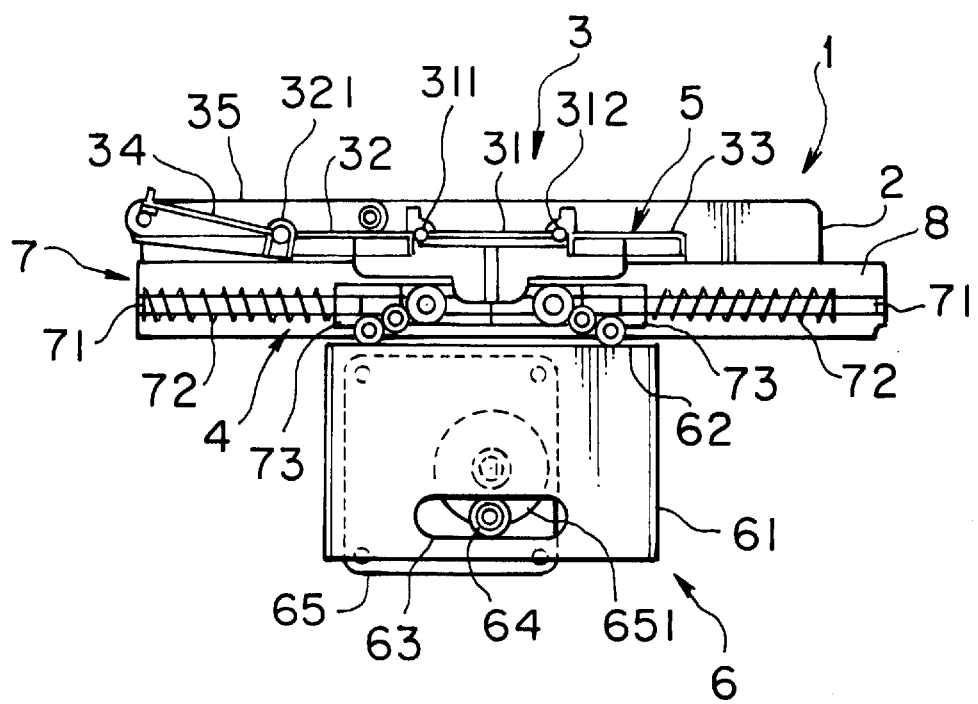
FIG. 3 is a front perspective view of the roll maker.
Figure 4:
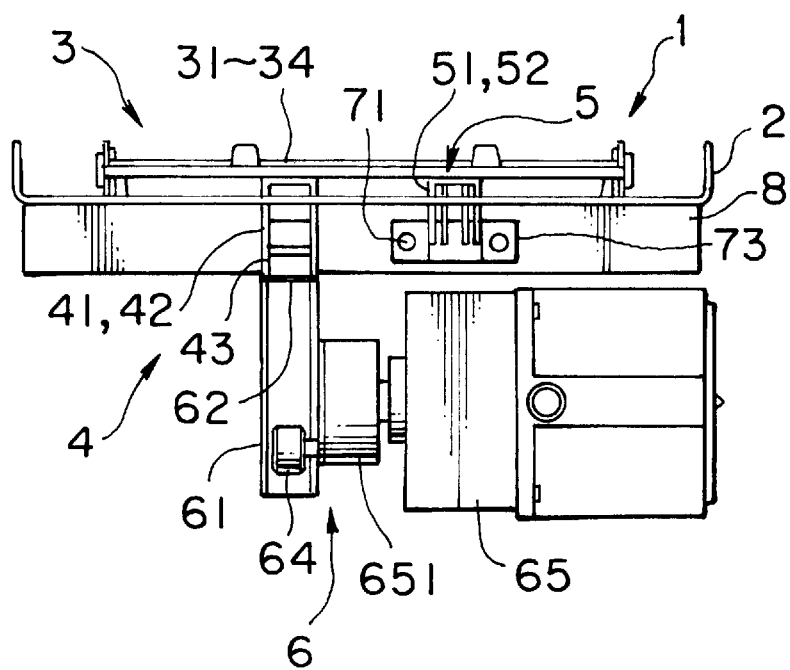
FIG. 4 is a left side perspective view of the roll maker.

FIGS. 2 to 4 are top, left side and front perspective view of showing a construction of the roll maker, respectively. The roll maker 1 comprises a rolling plate 3, a base board 2 under the rolling plate 3, and a slide board 8 under the base board 2. The reverse side of the slide board 8 has a sliding engagement (not shown) with a pinion gears 14 in its rack and pinion mechanism so that the rolling plate is slidingly mounted on the apparatus body 11. The reverse side of the rolling plate 3 is provided with a pair of cam devices 4 to bring the rolling plate into the folded shape; and a pair of levers 5 which acts to open and close the rolling plate.

Figure 5:
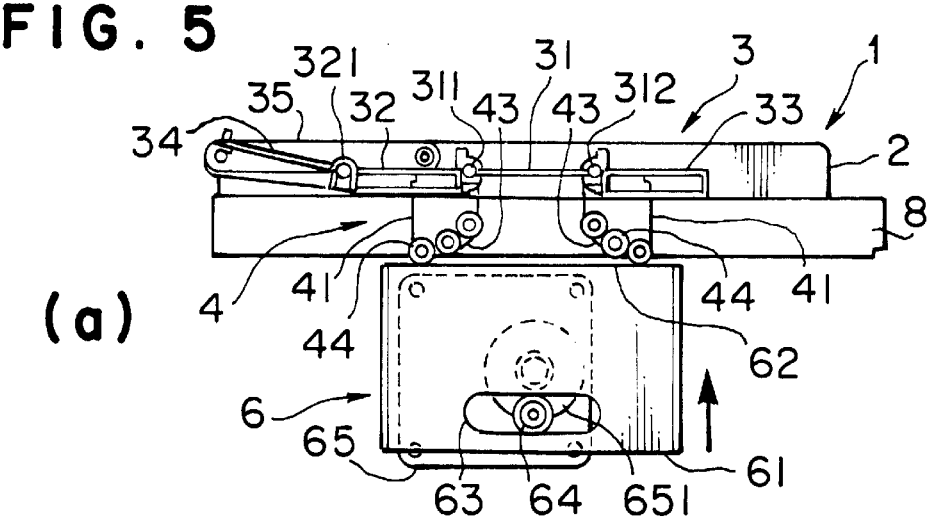
FIGS. 5(*a*) to 5(*c*) are illustrative views of the roll maker with operations of its cam members.
Figure 5:
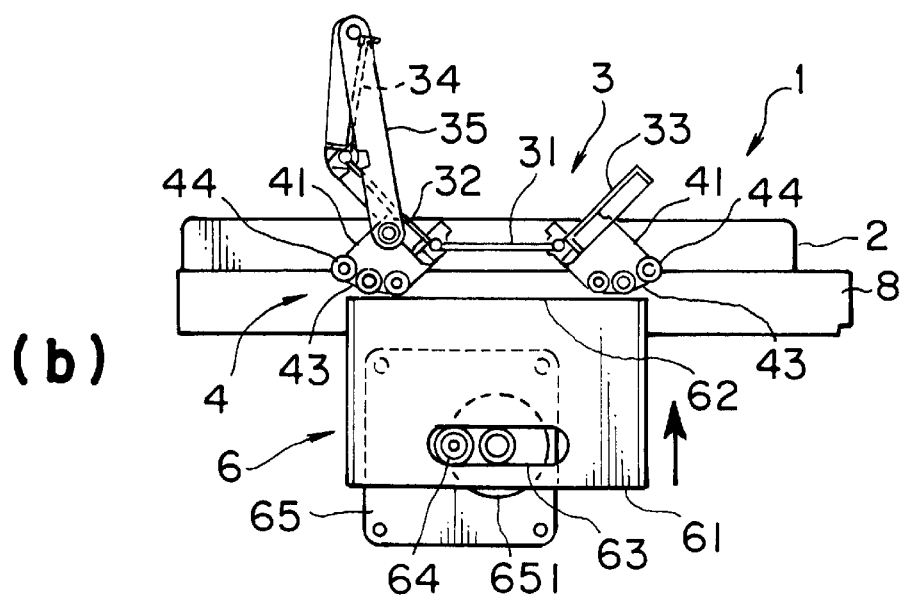
Figure 5:
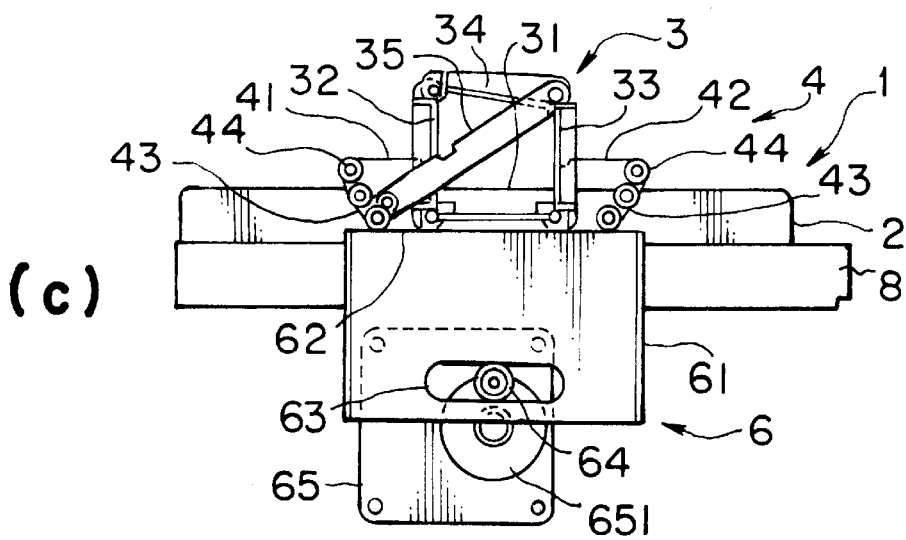

Referring also to FIG. 5(*a*), the rolling plate 3 on the base board 2 has a stationary plate 31 fixed to the base board 2; first and second rotating plates 32 and 33 rotatably mounted to the trailing and leading portions (left and right as shown in figures) of the stationary plate 31 through first and second pivots 311 and 312, respectively; and a third rotating plate 34 rotatably connected with the leading portion of the first rotating plate 31 through and about a third pivot 321. The free leading portion of the third rotating plate 31 connects with the base board 2 at the predetermined position thereof through a link arm 35.

Each of the first to third reverse rotating plates 32 to 34 has right and left flanges, which are formed with holes at respective leading and trailing portions, wherein the hole at the leading portion of one rotating plate is connected with the hole at the trailing portion of the other one by respective pivots 311, 312, and 321.

The cam mechanism 4 comprises fist and second cam devices 41 and 42 spaced apart from each other on same horizontal, the cam devices downwardly protruding from, respectively, reverse first and second rotating plates 32 and 33. The front faces of first and second cam devices 41 and 42, respectively are symmetrically opposite, and each vertical of the front faces is shorter than that of the rear so that each bottom 43 has a curve at the predetermined curvature, as shown in FIGS. 3 and 4.

Each of the base and slide boards 2 and 8 is formed having openings or cutouts through which the cam devices 41 and 42 pass to protrude beyond them. Each of first and second cam devices includes a pair of parallel boards with respective curved bottoms, and a plurality of rollers (three rollers) 44 arranged between the pair of parallel boards along respective curved bottoms thereof and pivotally mounted on respective shafts or pins. Each curvature of the curved edges 43 fits in general with the arrangement of the rollers. It is noted that the number and arrangement of the plural rollers are not limited.

At the lower housing of the apparatus under the roll maker 1, there is provided with a drive mechanism 6, which comprises a lift board 61 and a motor 65. The leading face 62 of the lift board 61 has a contacting relationship with bottoms of respectively, the first and second cam devices 41 and 42, as shown in FIG. 3 and 4. The lift board 61 moves up and down with the driven motor 65, as shown in FIGS. 5(*a*) to 5(*c*).

The motor 65 is provided with a disc-shaped motor arm 651 at its eccentric position, the arm having a cam roller 64, as shown in FIG. 4. The lift board 61 has a horizontally extending fit 63 in which the cam roller 64 is fitted, as shown in FIG. 3. The fit has a groove formed on its inner surface, and the raceway of the roller 64 is fitted in the groove. The engagement between the fit 63 and the roller 64 transforms rotation of the motor 65 into the upward and downward linear movement for transmission into the lift board 61, as shown in FIGS. 5(*a*) to 5(*c*).

Figure 6:
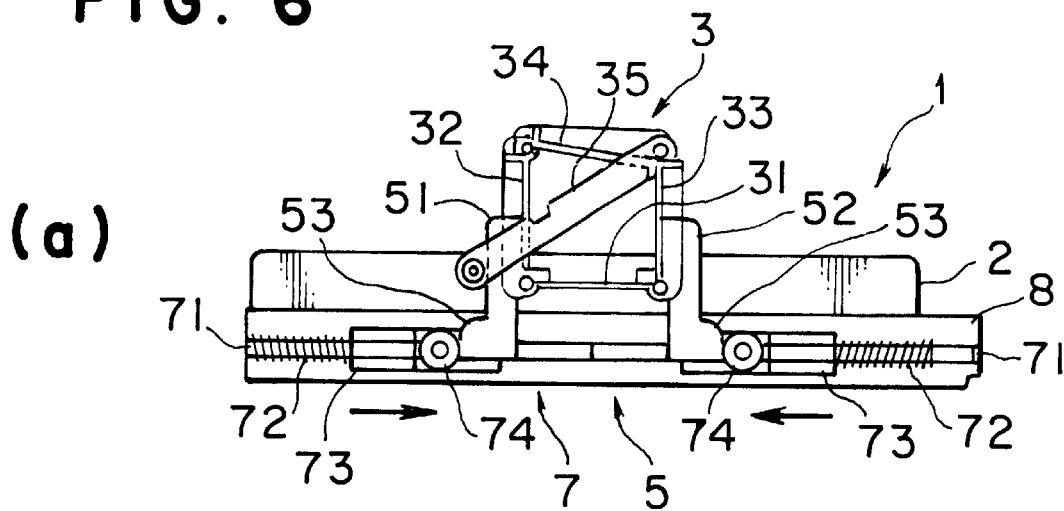
FIGS. 6(*a*) to 6(*c*) are illustrative views of the roll maker with operations of its lever for opening and closure of the rolling plate.
Figure 6:
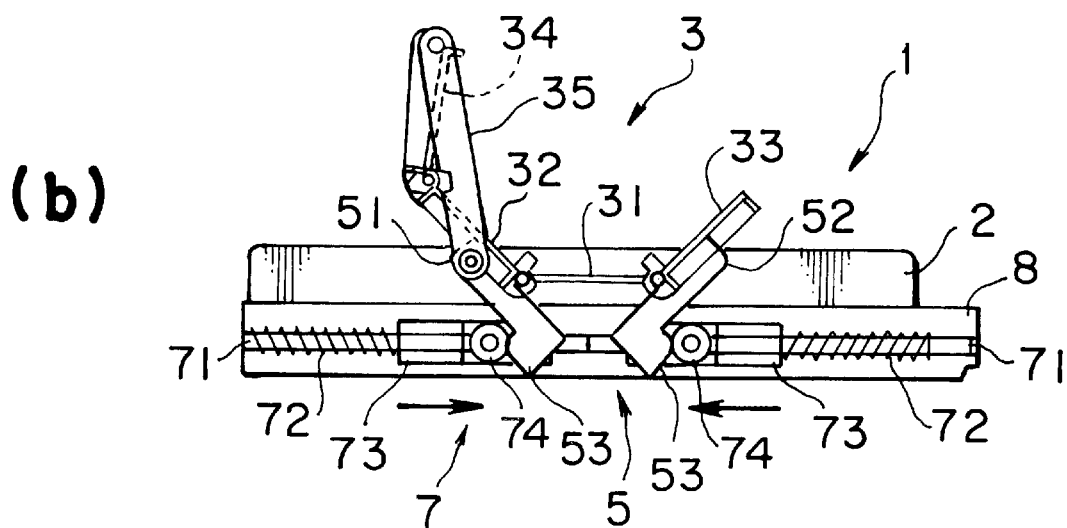
Figure 6:
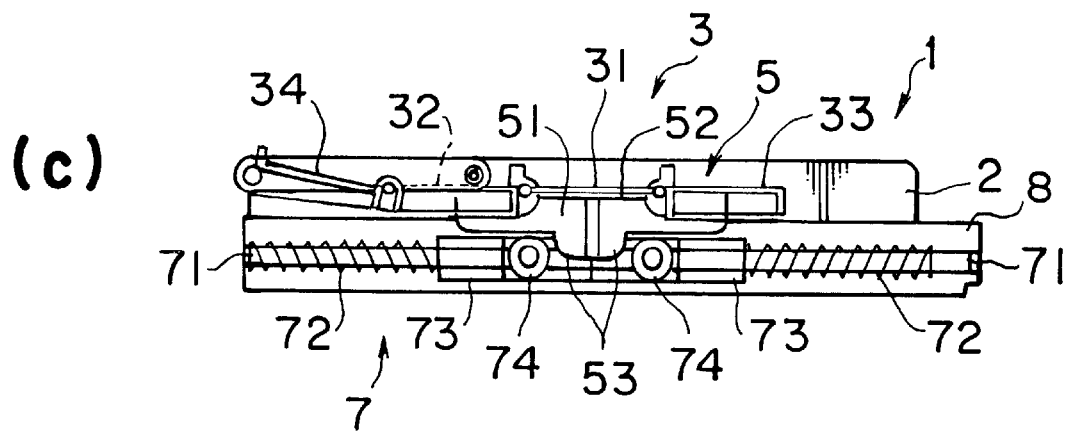

Referring to FIGS. 3 and 6(*a*), the lever 5 for opening and closure of the rolling plate comprises a first lever 51 on the reverse first rotating plate 32, and a second lever 52 on the reverse second rotating plate 33. On the reverses, the first and second levers 51 and 52, respectively, are positioned on the horizontal line spaced sideways from the cam member 4. Each of the first and second levers 51 and 52 comprises an arm portion and a L shaped hook 53. Their L shaped hooks 53 extend from the leading arm portions which are at a point of the first and second rotating plates from the medium to the trailing portion thereof, respectively, as shown in FIG. 3. One of the L characters is inverted, as shown in FIG. 6(*a*).

When the rolling plate 3 is mounted on the piled up base and slide boards, the first and second levers can partially protrude from the bottom of the slide board in the same manner as the description of the cam devices. Each levers comprises a pair of parallel boards which are disposed on the reverse rolling plate 3 that respective partial front (or bottom of the L character) overlap at the intermediate portion of the stationary plate, as shown in FIGS. 2 and 3.

On the reverse side of the base board 2, there is provided with a rolling plate opening retention mechanism 7. The retention mechanism 7 comprises a pair of guide shaft 71 positioned in parallel arrangement on both sides of the lever 5 distant therefrom, and a pair of right and left slider blocks 73 movably carried by both the guide shafts, and springs 72, respectively, fitted on the guide shafts at the left and right thereof so as to push to the rears of respective slider blocks 73, as shown in FIGS. 2 to 4.

Each of the slide blocks 73 has a pair of parallel right and left boards distally disposed on its approximate intermediate front face, wherein the boards of respective pairs have a push roller 74 mounted therebetween through a shaft at respective intermediate portions, and normally meet or contact each other at the distal end of respective parallel boards under forces of the springs 72. The hook 53 of each levers 51 and 52 protruding from the reverse base board 2 is at the position spaced apart from the front peaks of respective push rollers 74, at the time when the rolling plate 3 opens.

Description will now be directed to operation of the roll maker 1. Operation of the cam mechanism 4 for producing a folding up action of the rolling plate 3 is described with reference to FIGS. 5(*a*) to 5(*c*), while operation of the lever for producing opening and closing actions of the rolling plate 3 is described with reference to FIGS. 6(*a*) to 6(*c*).

Referring to FIG. 5(*a*), the rolling plate 3 on standby is shown, wherein the rotating plates 31 to 34 extend on the base board 2 so that the rolling plate 3 is in the form of a flat sheet shape. At the time, the opening and closing mechanism 5 is positioned as shown in FIG. 6(*c*).

On the rolling plate 3, dried laver(not shown) is placed, before that the vinegared rice of a board shape is supplied and put thereon from the vinegared rice rolling mill 10. Then, if required, at least one of ingredients is placed on the board shaped rice.

Referring to FIG. 5(*b*), the rolling plate 3 after an operation switch (not shown) of the motor 65 being turning on is shown, wherein the disk-shaped motor arm 651 is started in clockwise rotation through the motor 65 to circle the cam roller 64 thereof clockwise and upward.

The circled cam roller 64, which is fit in the horizontal fit 63 of the lift board 61, pushes the horizontal fit 63 up with the torque to cause the lift board 61 to run up. The run lift board 61 produces the upward rotation of each first and second cam boards 41 and 42 with its force that push to their lower sides contacted on its own leading portion, wherein the first and second cam devices 41 and 42, respectively, have a rotation in opposed directions to be in the form of an inverted v-shape so that the first and second rotating plates 32 and 33 have a upward rotation together, and the third rotating plate connected with the first rotating plate also rotates upward or is pulled. At the time, the lever unit 5 is positioned as shown in FIG. 6(b).

Referring to FIG. 5(c), the rolling plate 3 at the time when the run lift plate is at the top position is shown, wherein both the first and second cam devices 41 and 42 are located in a substantially parallel relationship with the base board 2.

Both the first and second rotating plates 32 and 33 rise perpendicularly, while the third rotating plate 34 is pulled from the link arm 35, and thereby undergoes its rotation to come to a position at the front of the second rotating plate 33.

Thus, the rolling plate 3 is folded to be in the form of a substantially square in section so as to roll up the placed dried laver, vinegared rice, and ingredients thereon, whereby the rolled up food in the form of a quadratic prism appears. Producing the vinegared rice rolled in dried laver, the lever device is a condition as shown in FIG. 6(a).

Thereafter, the rolling plate 3 is progressively opened by the rolling plate opening retention unit as the lift board 61 is started in downward movement with further rotation of the eccentric cam roller 64 by the motor arm 651.

In this construction of the roll maker 1, the rolling plate 3 is directly subjected to the force exerted by the lift plate 61 being moved up, and hence produces great pushes of the first to third rotating plates 32 to 34 as applied to the produced Norimaki or rolled up foods.

Referring to FIG. 6(a), when the rolling plate 3 has complete rolling up of a sheet of dried laver, vinegared rice, and, if required, ingredients, the levers 51 and 52 stand up straight with respect to the base plate 2 so that each of the hooks 53 pushes to the roller 74 of the slide block 73, while the slide blocks 73 push to respective springs 72 to come to the position most distant from each other by pressing against the spring 72. In order to push to the springs 72, each of side blocks 73 need production of greater force than the force exerted on it by the springs. The force produced by the slide blocks 73 causes increased push of respective rotating plates to a roll appearing.

As stated above, the progressive downward movement of the lift board causes rotation of the first and second cam devices toward respective original positions.

Referring to FIG. 6(b), when the progressive downward movement of the lift board 5 decreases the push of slider blocks 73 to the spring 72 to cause increase in push of the slider blocks to the hooks 51 and 52 such that the push rollers 74 may apply right and left force to the hooks 53 of the levers 51 and 52 so as to provide the opening of the rolling plate 3. Therefore, the levers 51 and 52 are progressively falling down toward the base board 2 to allow for rotation of the rotating plates 32 to 34 in the direction of opening thereof.

The application of the lateral force to the hooks 53 with respect to the apparatus may be performed by slider blocks which are of a hemispheric-shape at its distal end, in stead of the pressing rollers 74.

Referring to FIG. 6(c), when the lift board 61 reaches its lowermost point, each of the levers 51 and 52 has a substantial parallel relationship with respect to the base board 2 such that the rolling plate 3 extends at the base plate 2. Thus, the return of the rolling plate 3 to the standby state is made.

In this construction of the roll maker 1, the base board 2 has a complete separation from the lift board 61 so that the operator may remove the base board 2 from the producing apparatus without troublesome works of opening a snap-on lock that has connection between the base board and the lift board.

It is noted that the present invention should not be limited to the foregoing embodiments, the roll maker 1 may be used independently of or separated form the rolling mill 10, the third rotating plate 34 may be connected to the second rotating plate 33, and the inventive concepts are susceptible of application to modifications and equivalent techniques having same action or effect as the foregoing elements.

Therefore, the foregoing roll maker may be applied to production of rolled up foods except a vinegared rice rolled in dried laver (Norimaki).

What is claimed is:

1. An apparatus for producing a rolled up food product wherein materials including a sheet foodstuff, and a filler foodstuff put thereon are rolled up, the apparatus comprising a roll maker, and drive means, wherein said roll maker comprises a base board; a rolling plate positioned on said base board, the rolling plate comprising a stationary plate, first and second rotating plates rotatably connected to, respectively, trailing and leading portions of the stationary plate, and a third rotating plate connected to the leading portion of the first rotating plate, both leading sides of the third rotating plate each having connections with a link arm, the link arms being connected to the predetermined portion of said base board;

said drive means produces rotations of said first and second rotating plates, said third rotating plate having rotation with that of said first rotating plate, the drive means having a lift board, which moves up and down with respect to said base plate; and said reverse first and second rotating plates each has cam means having a curved leading edge of the predetermined curvature, the curved edges being symmetrically arranged as opposed to each other, and being subjected to concurrent force of said lift board moving up and down, whereby said both of cam means rotate to allow rotation of said first and second rotating plates.

2. The apparatus as defined in claim 1, wherein each said cam member has a plurality of rollers disposed substantially along each said curved edge.

3. The apparatus for producing a rolled up food product as defined in claim 1, wherein each of first and second rotating plates has a lever mounted on the reverse thereof for opening and closure of said rolling plate, each said lever has a L-shaped hook, and the hooks are symmetrically opposite each other and has a downward arrangement; and wherein said base board has a plate opening means having resilient force applied to the leading portions of said hooks so as to maintain the opening of said first and second rotating plates in their opening direction.

4. The apparatus as defined in claim 3, wherein said plate opening means comprises guide shafts disposed on the back of said base board and arranged in parallel along a connecting direction with respect to said rotating plates; a pair of slide blocks mounted to said guide shafts, respectively for applying force to the leading portions of said hooks, when said first and second rotating plate operate to open; and biasing means for biasing said pair of slider blocks in the direction of respective hooks.

5. The apparatus as defined in claim 4, wherein said each of slide blocks has a push roller, and the push rollers have contact relation with the leading portions of said hooks, respectively.

* * * * *